July 19, 1955 J. G. LINDEMAN ET AL 2,713,298
INTEGRAL TOOL CARRIER
Filed Sept. 22, 1949 8 Sheets-Sheet 1

INVENTORS
JESSE G. LINDEMAN, LAWRENCE F. HEINL,
ROBERT D. KREHBIEL, ORIE L. DURLAND
BY
ATTORNEYS

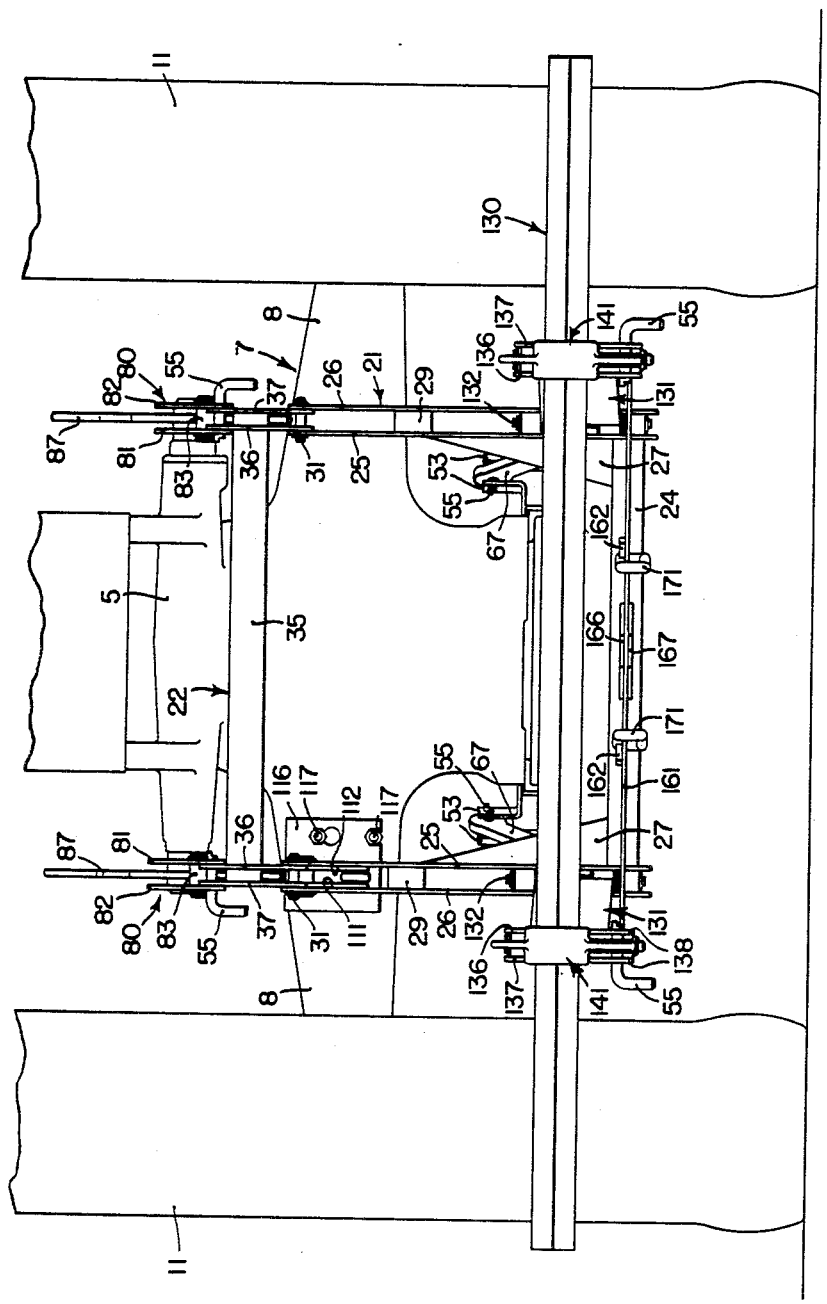

July 19, 1955  J. G. LINDEMAN ET AL  2,713,298
INTEGRAL TOOL CARRIER
Filed Sept. 22, 1949  8 Sheets-Sheet 3
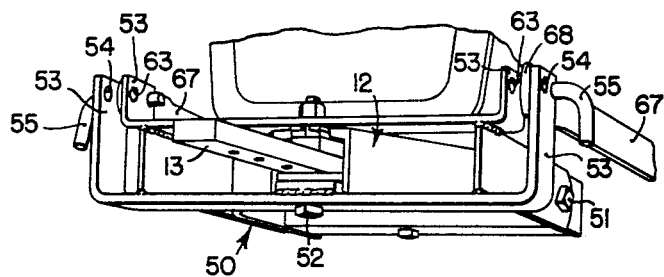
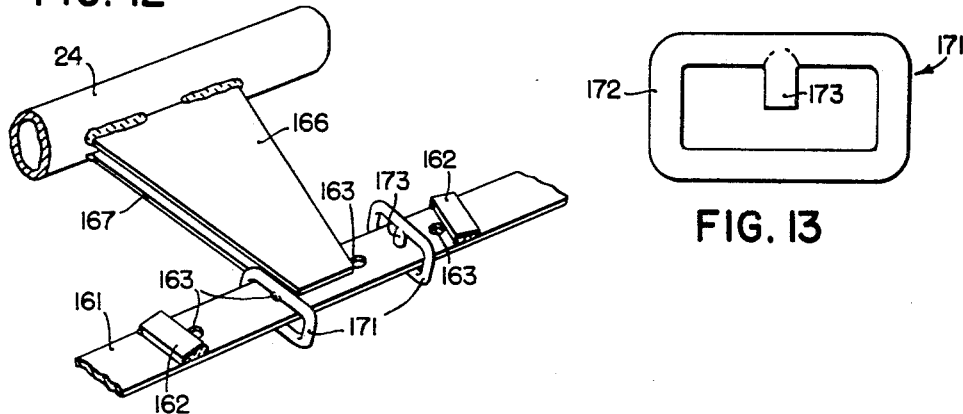
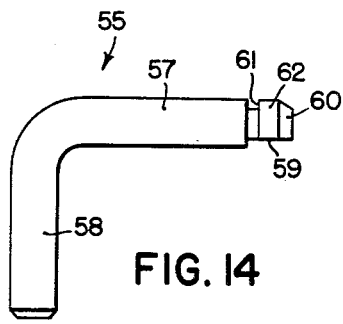
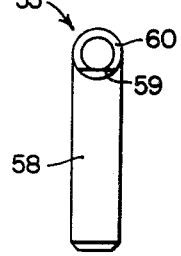
INVENTORS.
JESSE G. LINDEMAN, LAWRENCE F. HEINL,
ROBERT D. KREHBIEL, ORIE L. DURLAND
BY
ATTORNEYS July 19, 1955   J. G. LINDEMAN ET AL   2,713,298
INTEGRAL TOOL CARRIER
Filed Sept. 22, 1949   8 Sheets-Sheet 4
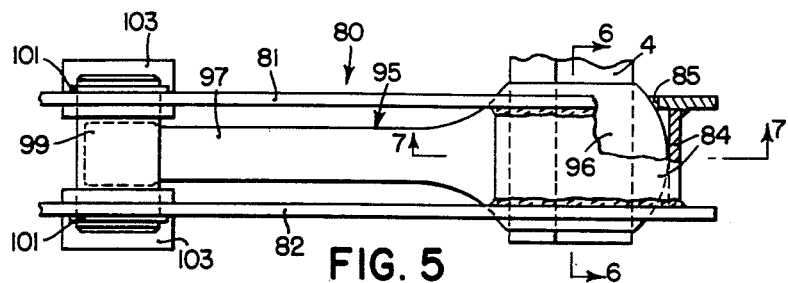
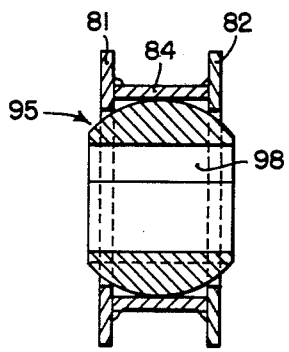
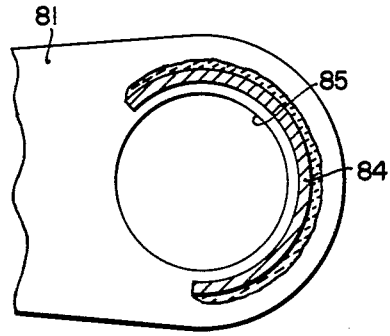
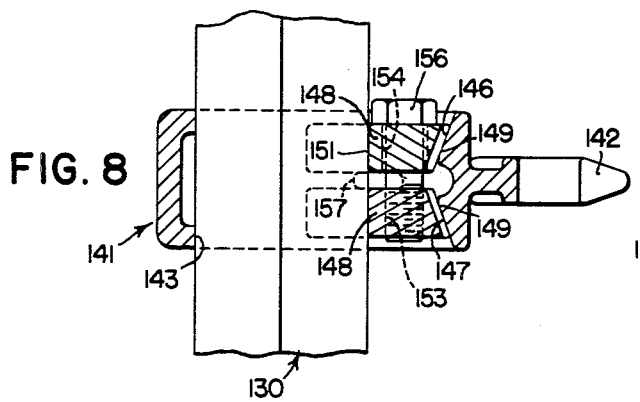
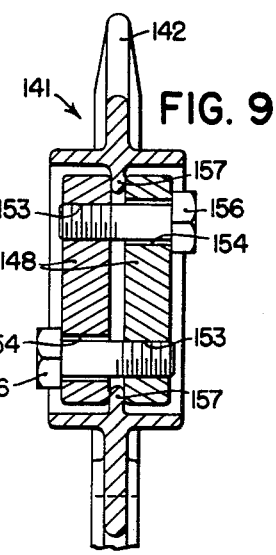
INVENTORS.
JESSE G. LINDEMAN, LAWRENCE F. HEINL,
ROBERT D. KREHBIEL, ORIE L. DURLAND
BY
ATTORNEYS INVENTORS.
JESSE G. LINDEMAN, LAWRENCE F. HEINL,
ROBERT D. KREHBIEL, ORIE L. DURLAND
BY
ATTORNEYS July 19, 1955
J. G. LINDEMAN ET AL
2,713,298
INTEGRAL TOOL CARRIER
Filed Sept. 22, 1949
8 Sheets-Sheet 6
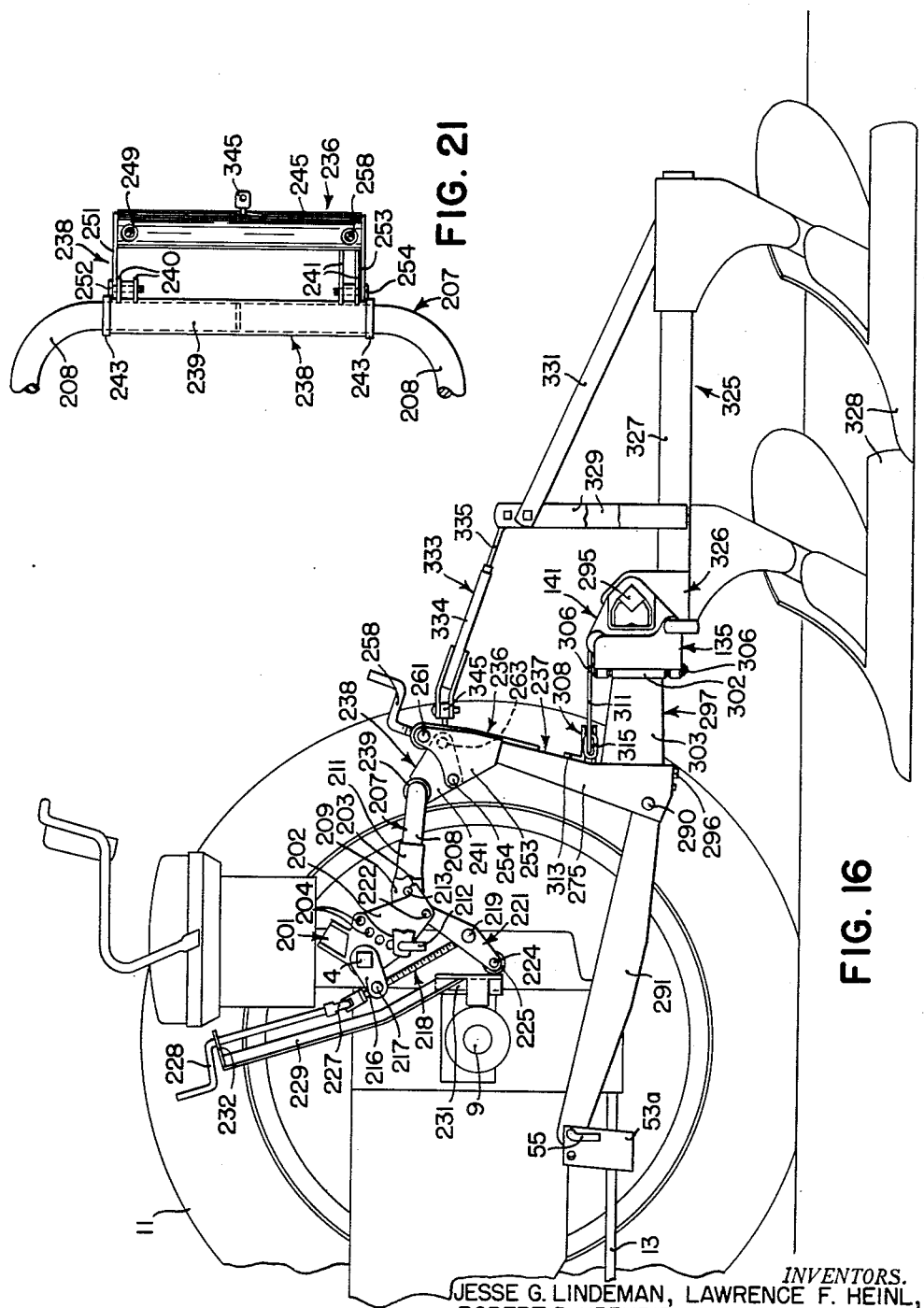
INVENTORS.
JESSE G. LINDEMAN, LAWRENCE F. HEINL,
ROBERT D. KREHBIEL, ORIE L. DURLAND
BY
ATTORNEYS July 19, 1955  J. G. LINDEMAN ET AL  2,713,298
INTEGRAL TOOL CARRIER
Filed Sept. 22, 1949  8 Sheets-Sheet 8

INVENTORS.
JESSE G. LINDEMAN, LAWRENCE F. HEINL,
ROBERT D. KREHBIEL, ORIE L. DURLAND
BY
C. T. Parker and R. Johnson
ATTORNEYS United States Patent Office
2,713,298
Patented July 19, 1955

2,713,298

INTEGRAL TOOL CARRIER

Jesse G. Lindeman, Yakima, Lawrence F. Heinl, Zillah, and Robert D. Krehbiel and Orie L. Durland, Yakima, Wash., assignors, by mesne assignments, to Deere & Company, Moline, Ill., a corporation of Illinois Application September 22, 1949, Serial No. 117,087

22 Claims. (Cl. 97—47.54)

This application is a continuation-in-part of our co-pending application, Serial No. 49,694, filed September 17, 1948, for Integral Tool Carrier, now U. S. Patent 2,616,349, issued November 4, 1952.

The present invention relates generally to agricultural implements and more particularly to draft devices for mounting agricultural implements on or connecting them to farm tractors or the like.

The object and general nature of the present invention is the provision of a new and improved quick detachable tool carrier of the tool bar type adapted to be mounted on a farm tractor and to receive a plurality of ground working and other implements. A further feature of this invention is the provision of a tool carrier that is adapted to be controlled by the regular power lift of the tractor, and a still further feature of this invention is the provision of a tool carrier which, when attached to the tractor, forms an integral part thereof and serves as means for carrying implements and the like in a compact and closely coupled arrangement, whereby the entire outfit is practically as maneuverable as the tractor alone.

A further feature of this invention is the provision of new and improved means, acting through the tool carrier, for adjusting the implement depth, the amount and degree of suction of earth-working tools, and the lateral or transverse leveling of the implements. Further, it is a feature of this invention to provide a tool carrier of the type which may be adjusted to accommodate free lateral movement of the tool carried by the carrier or the parts may be arranged so that the implement may be locked in place laterally, as for transporting or when operating tools where a laterally rigid hitch is desired.

An additional feature of the present invention is the provision of an integral tool carrier embodying a bail-like member swingably connected with the tractor and an articulated frame means pivotally interconnected and having the lower section connected with the tractor by means of universally connected links, along the lower frame, which carries a soil-working tool, to be adjusted to different positions by tilting the frame about a generally longitudinal axis relative to the tractor.

These and other objects and advantages of the present invention will be apparent to those skilled in the art after a consideration of the following detailed description of the preferred structure, taken in conjunction with the accompanying drawings.

In the drawings:

Figure 1 is a side view and Figure 2 is a rear view of one form of a tractor-carried or integral tool carrier, shown as mounted on a tractor of the type having a power lift including a rear transverse power lift rockshaft.

Figure 4 is a fragmentary perspective view of the drawbar bracket or draft link support and its connection to the tractor and the tractor drawbar support.

Figure 5 is a partial or fragmentary plan view of power lift arm or upper link connection between the tool carrier hitch frame and the tractor power lift rockshaft.

Figures 6 and 7 are sectional views taken, respectively, on the lines 6—6 and 7—7 of Figure 5, the ball joint arm being omitted in Figure 7.

Figure 1:
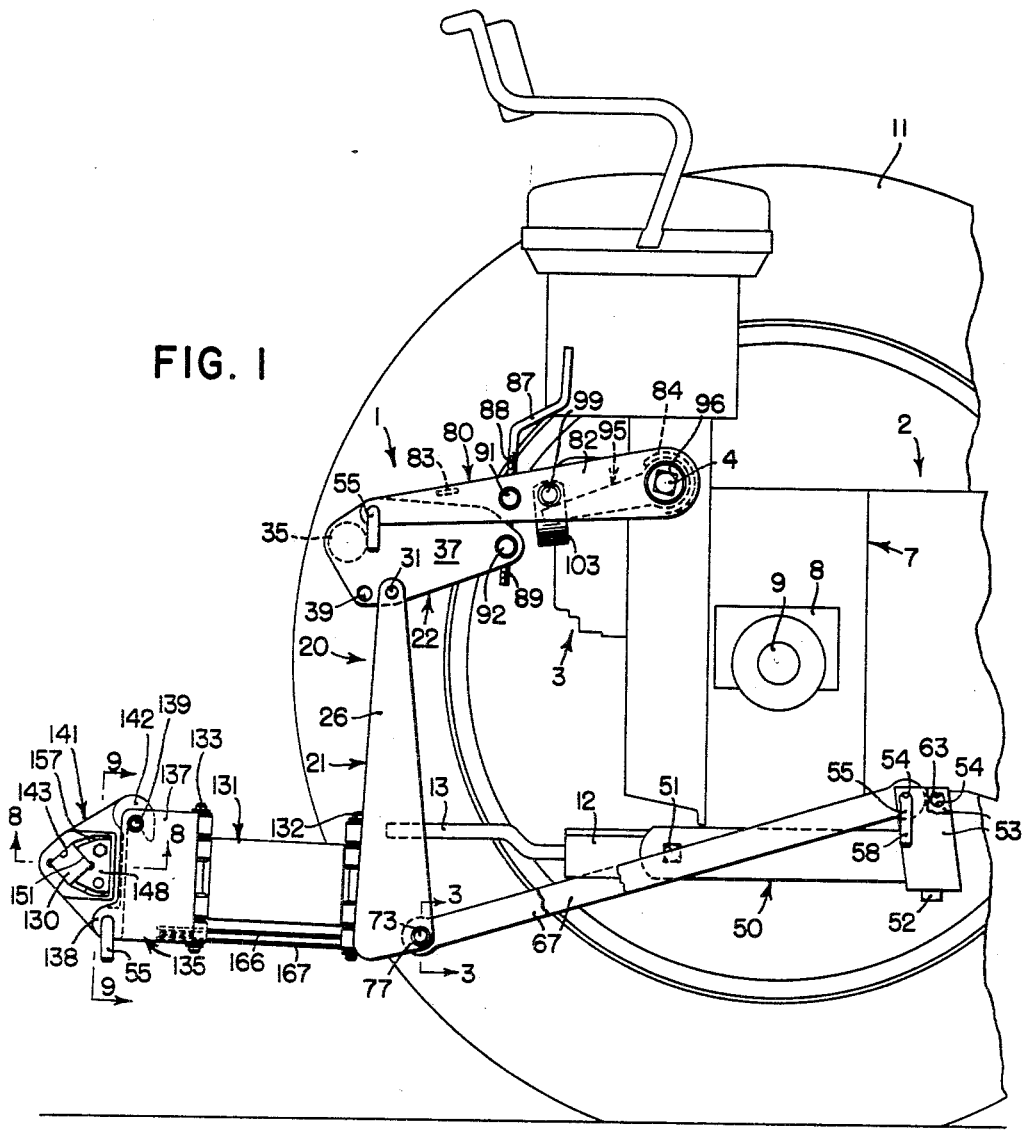

Figures 8 and 9 are sectional views taken respectively along the lines 8—8 and 9—9 of Figure 1, showing one form of tool bar mounting.

Figure 10:
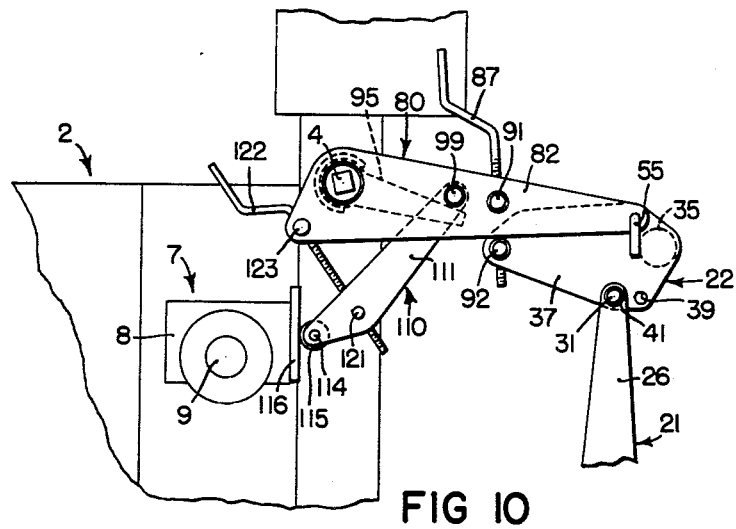

Figure 10 is a fragmentary side view showing the adjustable stop means limiting the lower position of the tool carrier.

Figure 11:
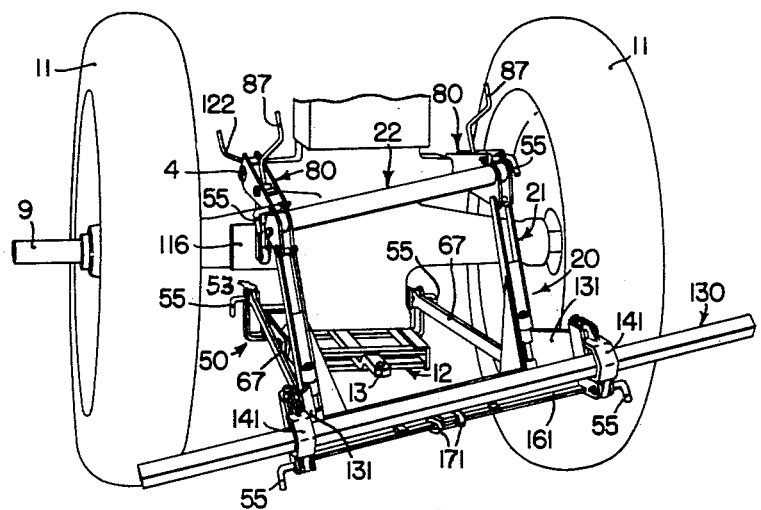

Figure 11 is a fragmentary perspective view showing the tool carrier adjusted for operating with the tool bar in a laterally tilted position, as may be desirable when using a plow attachment, with the right hand rear tractor wheel operating in a previously formed furrow.

Figure 12 is a fragmentary view showing the means for limiting the lateral movement of the tool bar relative to the hitch frame.

Figure 13 is a detail view of one of the stop members shown in Figure 12.

Figures 14 and 15 are side and end views, respectively, of one of the quick detachable pins employed for connecting the tool carrier with the tractor.

Figure 17:
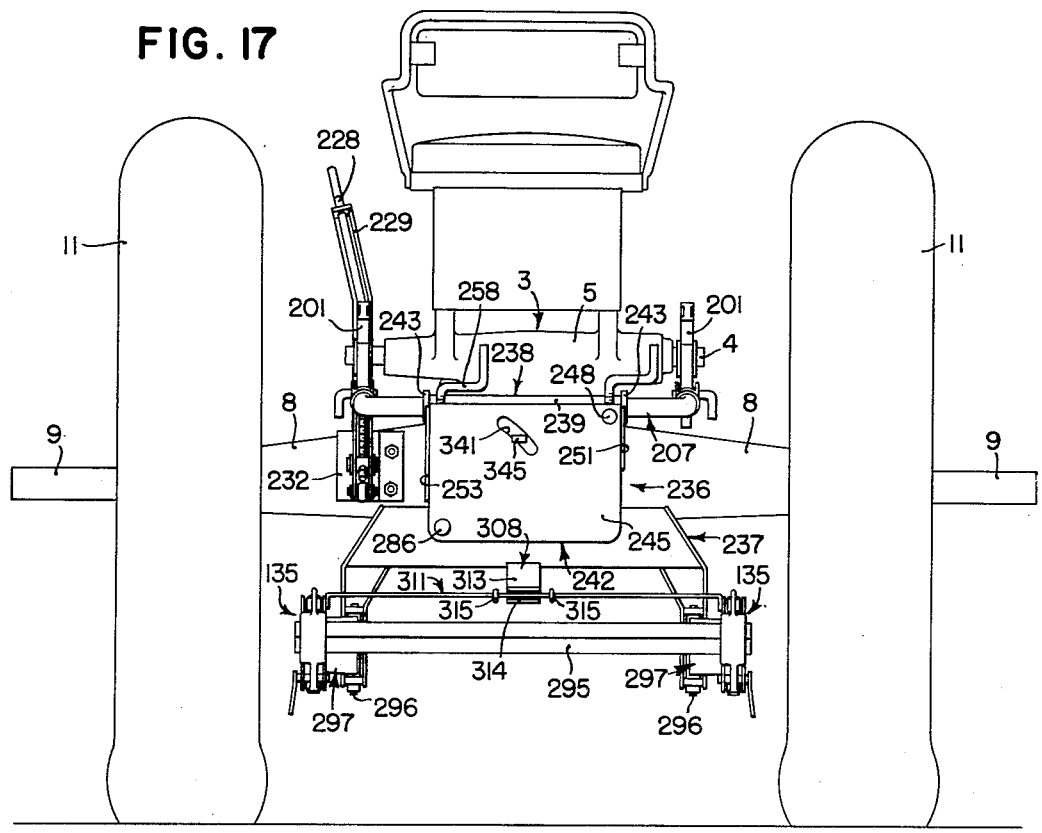

Figures 16 and 17 are side and end views of a modified form of integral carrier in which the principles of the present invention have been incorporated.

Figure 18:
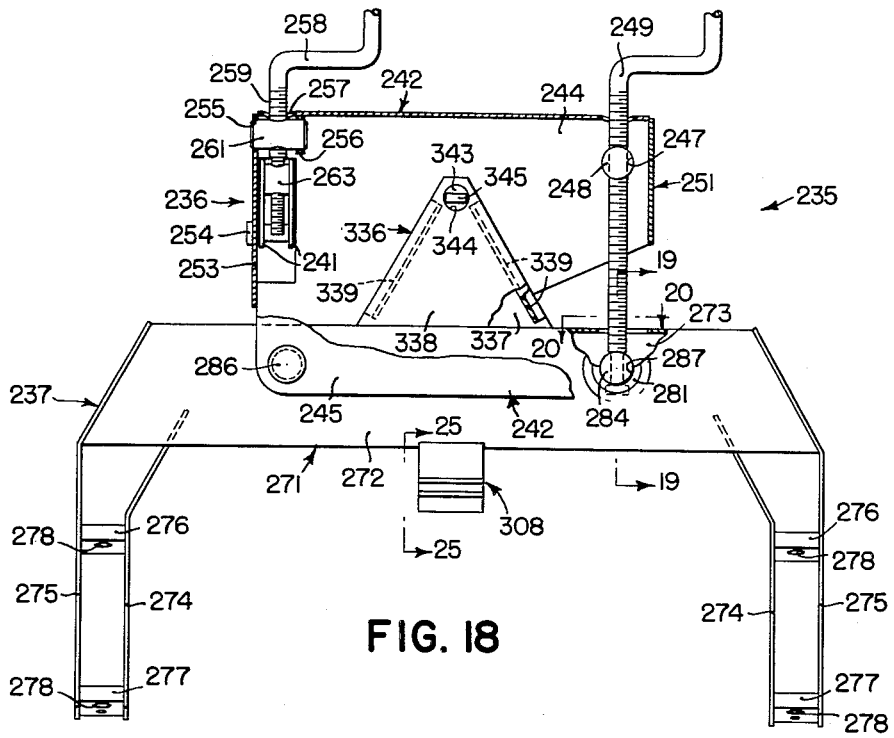

Figure 18 is a rear view of the lower main frame and the upper leveling frame, certain parts being broken away so as to show the associated connecting and adjusting means.

Figure 19:
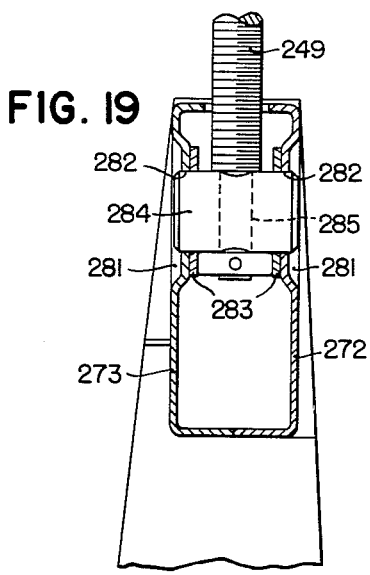
Figure 20:
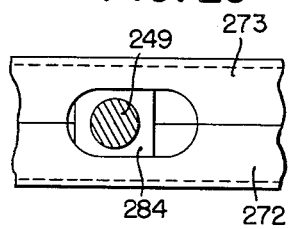

Figures 19 and 20 are enlarged sectional views taken along the lines 19—19 and 20—20 of Figure 18.

Figure 21 is a fragmentary plan view, looking downwardly on the upper part of the leveling frame and the associated portions of the power lift actuated bail.

Figure 22:
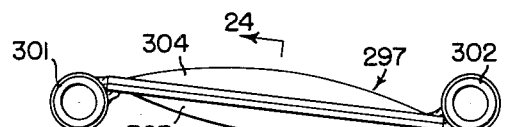
Figure 23:
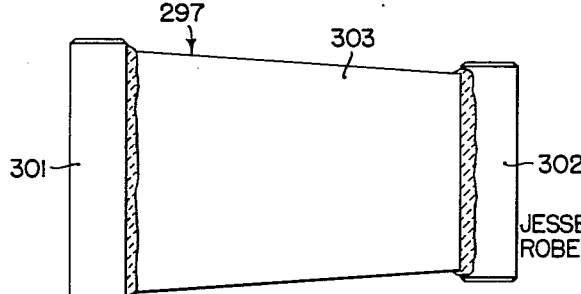

Figures 22 and 23 are detail views of one of the two sway links by which the tool bar is connected with the main frame of the carrier.

Figure 24:
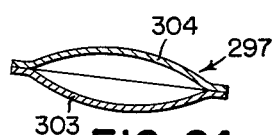

Figure 24 is a sectional view taken along the line 24—24 of Figure 22.

Figure 25:
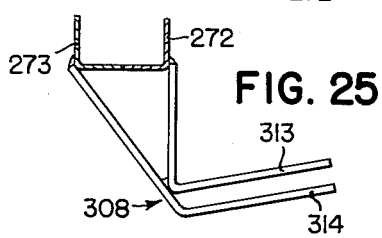

Figure 25 is a fragmentary view showing the sway stop.

Referring first to Figures 1 and 2, the draft device of the present invention is shown as a tool carrier, indicated in its entirety by the reference numeral 1, mounted on a tractor 2 of the type having a controllable power lift unit 3 which is arranged to operate a transverse power lift rockshaft 4, the ends of which extend from opposite sides of a power lift rockshaft housing 5. The tractor and power lift is conventional, so far as the present invention is concerned, and may be similar to that shown in U. S. Patent 2,302,637, issued November 17, 1942, to E. McCormick et al. The tractor 2 includes a rear axle housing 7 in lateral extensions 8 of which are axle shafts 9 on which rear traction wheels 11 are mounted. The lower portion of the rear axle housing 7, centrally of the tractor, carries a drawbar support 12 in which a laterally swingable drawbar 13 is disposed.

The draft device or tool carrier 1 includes a generally vertically disposed rigid hitch frame 20 which comprises a lower main frame unit 21 and an upper rigid leveling frame 22. As best shown in Figures 2 and 11, the lower frame unit 21 comprises a rigid frame section made up of a lower transverse tubular member 24 to each end of which a pair of vertical, closely spaced frame plates 25 and 26 are connected, as by welding or the like. The pairs of plates 25 and 26, Fig. 2, form spaced apart, generally vertically disposed frame sections, and the tubular member to which the plates 25 and 26 are welded constitutes a crossbar portion rigidly interconnecting said sections. Gusset plates 27 are welded to the inner plates 25 and the end portions of the transverse tubular member 24. Each pair of plates 25 and 26 is rigidly interconnected by one or more spacers 29, and the upper ends of the frame plates 25 and 26 are apertured to receive a pivot pin 31.

The leveling frame unit 22 comprises a rigid structure made up of a transverse tubular member 35 to each end of which is rigidly connected, as by welding, a pair of closely spaced plates 36 and 37, the spacing between the plates being such that they fit snugly between the upper portions of the main frame plates 25 and 26, as best shown in Figure 2. The lower rear portions of the plates 36 and 37 are provided with a pair of apertures 39 adapted to receive the associated pivot pin 31 and providing for two positions of the latter, as best shown in Figure 1. The pins 31 and associated parts provide a hinged connection between the main frame unit 21 and the leveling frame unit 22 whereby one part is constrained to move relative to the other about a transverse hinge axis, as defined by the pins 31. The latter may be of any suitable construction but preferably are relatively short cylindrical members having grooves at the end portions to receive snap rings 41 (Figure 10) which detachably hold the associated parts in assembled relation.

A draft link support in the form of a drawbar bracket 50 is adapted to be secured by a plurality of bolts 51 and 52 to the tractor drawbar support 12. The drawbar bracket 50 includes pairs of upstanding lugs 53, each provided with a pair of apertures 54 by which each pair of lugs is adapted to receive a quick detachable pin 55 in either of two optional positions. The construction of the pins 55 is best shown in Figures 14 and 15. Each pin includes a shaft portion 57 and a handle portion 58, the shaft portion being insertable through the openings in the lugs and/or other parts to receive it. The end of the shaft section 57 is slabbed off, as shown at 59, tapered at its outer end, as shown at 60, and is provided with an annular groove 61 which lies between a cylindrical portion 62 and the main body of the shaft section 57. The slabbed-off portion 59 lies at the side adjacent the handle 58 and is thus arranged so that the pin may be inserted in openings arranged to fit the shaft section 57 with the exception that one of the inner openings, as the opening in the inner lug portion 53, is provided with an inwardly directed section 63 which is circularly complementary with respect to the slabbed-off portion 59. Thus, when the pin 55 is turned to bring the handle section 58 upwardly and inserted in that position in the openings, the slabbed-off portion 59 receives the inner section 63, and then when the handle section 58 is turned downwardly, the portion 63 interlocks in the groove 61 and prevents accidental disconnection of the pin 55. The bolt 52 serves also to pivotally interconnect the tractor drawbar 13 with the tractor drawbar support 12. Ordinarily, the drawbar bracket 50 is left as a more or less permanent part of the tractor, even when the integral tool carrier 1 of the present invention is disconnected from the tractor to provide for other uses of the latter.

Figure 3:
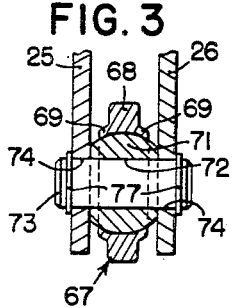
Figure 3 is a fragmentary sectional view taken along the line 3—3 of Figure 1, showing the ball and socket type of connection between the front and rear ends of the laterally spaced lower draft links and the tractor and tool carrier hitch frame.

The lower portion of the tool carrier hitch frame 20 is connected with the drawbar bracket 50 by link means which not only transmits the draft of the tools to the tractor but also provides for not only up-and-down movement of the hitch frame 20 but also lateral swinging and oscillation with respect to the tractor. Referring now more particularly to Figures 1–4, a pair of lower links 67 extends between the tractor and the lower portion of the hitch frame 20. Each link 67 includes an enlarged apertured end portion 68, the sides 69 of which are flanged and embrace a spherical bushing 71, the aperture 72 of which is dimensioned to fit snugly over the associated pivot pin. In order to hold the bushing 71 in place, the flanges 69 are crimped so as to snugly embrace the outer spherical surface of the associated bushing 71. The front end bushings 71 receive the shaft sections 57 of the associated quick detachable pins 55, and as best shown in Figure 3, the rear end of each of the links 67 is connected through the associated bushing 71 with a pivot pin 73 that extends through apertures 74 in the lower portions of the associated hitch frame plates 25 and 26. Each end of each pin 73 is grooved to receive a detachable snap ring 77, the rings 77 holding the pivot pins 73 in place but permitting their ready removal when desired. The hitch pin 73 and associated parts may be substantially identical with the connecting pin 31 mentioned above.

A pair of upper link members, each indicated in its entirety by the reference numeral 80, connects the leveling frame unit 22 of the hitch frame 20 with the tractor 2. Preferably this connection is made through the tractor power lift rockshaft 4 and the link members 80 are arranged to be so connected with the power lift rockshaft 4 as to serve as lift arms for raising the hitch frame 20 and associated tool-receiving bar and the tools connected therewith. Each link or power lift arm 80 comprises two plates 81 and 82 rigidly interconnected by a spacer 83 and an arcuate part 84 which partially encircles and is concentric with respect to openings 85 in the forward ends of the plates 81 and 82. The rear ends of each pair of plates 81 and 82 are pivotally connected with the associated pair of plates 36 and 37 of the leveling frame unit 22, by a quick detachable hitch pin that is identical with the hitch pin 55 described above. Thus, the last mentioned hitch pins establish a transverse axis about which the right and left hand links or arm members 80 are hingedly connected with the leveling frame unit 22 but relative movement between the parts in any other direction is restrained, not only by the hinged connection but also by the fact that the leveling frame plates 36 and 37 snugly fit within the lift arm plates 81 and 82, as best shown in Figure 2. While we have shown both connections as established through a quick detachable pin 55, only one need be quick detachable. The other may be a pin like that shown in Figure 3. Each arm 80 is adjustable relative to the adjacent portion of the leveling frame 22 by means of a crank screw 87 which is provided with oppositely threaded portions 88 and 89 received in swiveled trunnions 91 and 92 carried, respectively, by the plates 81, 82 and 36, 37, the members 91 and 92 having screw-threaded openings to receive the crank screw portions 88 and 89.

The forward end portions of the lifting arm plate members 81 and 82 are disposed on opposite sides of a ball joint arm 95, which, as best shown in Figures 5 and 6, includes a ball section 96 and an arm section 97 that extends in between the plate members 81 and 82 rearwardly of the rockshaft. The ball section 96 is provided with a square opening 98 to fit snugly but shiftably over the associated end of the power lift rockshaft 4, and the outer or rear end of each ball joint arm 95 is adapted to be disposed underneath an abutment pin 99 which is carried by the plate members 81 and 82 forward of the swiveled trunnion 91. The abutment pin 99 may, if desired, be substantially identical with the pivot pin 73 described above and, like that member, be provided with annular grooves at the end to receive retaining snap rings 101 or other fastening means. As will be seen from Figure 1, the outer ends of the ball joint arms 95 are disposed underneath the associated abutment pin 99, whereby the tool carrier 1 may move upwardly relative to the arms 95, which are held in position by the power lift shaft 4. However, when the latter shaft is rocked in a clockwise direction (Figure 1) the arms 80 and the entire tool carrier 1 are lifted into a raised or transport position. A pair of guide clips 103 are welded to the inner sides of the plates 81 and 82 and diverge downwardly and outwardly at their lower ends so as to guide the outer end of the associated ball joint arm 95 into position in contact with the abutment pin 99. Each of the lift arms 80, in any position of adjustment as determined by the crank screws 87, is connected as a rigid part of the leveling frame unit 22. However, the latter unit is pivotally connected with the rockshaft 4 through the ball joint sections 84, 85 and 96. The leveling frame unit 22 pivots relative to the upper portions of the hitch frame 21 by virtue of the pivot pins 31, as described above.

As best shown in Figures 2 and 10, the left hand lift arm 80 carries a pivoted stop bar, indicated in its entirety by the reference numeral 110. The stop bar 110 is made up of a pair of plates 111 and 112 apertured at their upper ends to receive and be mounted on the stop or abutment pin 99, by which the ball joint arm 95 on the left hand end of the power lift rockshaft 4 engages and raises the left hand arm 80. The lower end of the stop bar plates 111 and 112 are apertured to receive a pin 114 on which a stop roller 115 is mounted. The roller 115 is adapted to engage a stop plate 116 that is detachably fastened to the tractor rear axle housing extension 8 by studs 117. The plates 111 and 112 are extended intermediate their ends and apertured to receive a swiveled trunnion 121 in which the lower threaded end of a crank screw 122 is received. The upper portion of the crank screw 122 is rotatably supported on a swiveled trunnion 123 carried by the forward portion of the associated lift arm plates 81 and 82. Turning the crank screw 122 adjusts the position of the stop bar unit 110 relative to the associated lift arm 80 and thus serves to limit the downward movement of the leveling frame unit 22 and hence the entire tool bar carrier 1, relative to the tractor. At the left side of the tractor, the rear end of the ball joint arm 95 is received between the stop bar plates 111 and 112.

The transverse tool bar, on which any one of a plurality of ground-working or crop-working tools or implements may be mounted, is indicated in its entirety by the reference numeral 130. Preferably, the bar 130 extends laterally outwardly at opposite sides of the tractor and rearwardly of the rear tractor wheels 11. A pair of sway fittings 131, preferably in the form of links, are hingedly connected, as at 132, to the lower portions of the pairs of vertical plates 25, 26, and each sway fitting or link 131 is hingedly connected, as at 133, to a tool bar carrying bracket 135. Each bracket is made up of a pair of plates 136 and 137, the lower rear portions of which are extended in the form of lugs 138 which are apertured to receive a quick detachable pin 55. The upper rear portions of each pair of plates 136 and 137 carries a pin 139 which is rigidly secured to the plates 136 and 137 and serves as a spacer therefor. Detachably carried by each bracket 135 is a coupling member 141 having an upper forwardly disposed hook section 142 and an apertured portion 143 in which the tool bar 130 is disposed. The apertured portion 143 is considerably larger than the bar 130, and at the forward side of the opening 143 a pair of opposite angled camming faces 146 and 147 are formed. Cooperating with these angled faces 146 and 147 is a pair of clamping members 148 having upper and lower cooperating angled faces 149. Each cam member is provided with a pair of vertically spaced openings and a rearwardly facing V-shaped notch 151 to receive the forward side of the square bar 130. In each cam member 148 one of the openings, as indicated at 153 (Figure 8), is threaded, and the other opening, as indicated at 154, is cored. Thus, when the two cam members 148 are assembled in proper position, as shown in Figure 8, a cap screw 156 may be inserted through the cored opening 154 in one of the cam members 148 and threaded into the opening 153 in the other cam member. Then by tightening both cap screws 156, from opposite sides of the coupling member 141, the tool bar 130 is firmly and rigidly clamped in position. A center lug 157 is carried by upper and lower portions of the coupling member 141 for the purpose of centering the upper and lower portions of the two associated cam members 148.

As best shown in Figures 2 and 12, a transverse bar 161 is connected at its opposite ends to the inner plates of the tool bar receiving brackets 135 and receives a pair of fixed stops 162. A plurality of openings 163 are formed in the bar 161 between the stops 162, and welded at their forward ends to the central portion of the transverse tubular member 24 are upper and lower sway stops 166 and 167, the rear ends of which are disposed, respectively, above and below the transverse bar 161. If it should be desired to limit all lateral movement of the tool bar 130 relative to the tool carrier frame, a pair of link locks 171 are disposed in the laterally innermost pair of openings 163, which are spaced apart so that the link locks 171 are in substantial contact with the rear ends of the sway stop plates 166 and 167. If lateral movement of the tool bar is desired, the link locks 171 are moved through the outermost openings 163, adjacent the fixed stops 162. The link locks 171 are constructed as best shown in Figure 13. Essentially, the members 171 comprise a closed member 172 having a depending lug 173 which is adapted to be removably disposed in one or the other of the openings 163 at the side of the sway stop plates 166 and 167.

The mounting of the tool carrier as so far described on a tractor is substantially as follows:

After the draft link support or drawbar bracket 50 is mounted in place on the tractor, the forward ends of the links 67 are connected to the lugs 53 by the quick detachable pins 55, the rear ends of the draft links 67 normally being permanently connected by the pins 77 to the lower portion of the main frame unit 21. One of the lift arms 80 is then detached at its rear end from the leveling frame unit 22 and individually mounted on the associated end of the power lift rockshaft 4 by slipping the ball member 96 over one end of the tractor power lift rockshaft 4. Next, the power lift of the tractor is operated to rock the shaft 4 into its lower position, and then the hitch frame 20 is lifted into a position to permit the other lift arm 80, which ordinarily is permanently connected to the leveling frame 22, to be mounted on the other end of the tractor power lift rockshaft 4. Next, the first mentioned lift arm 80 is reconnected to the leveling frame 22 by the associated quick detachable pin 55. This holds the two lift arms 80 on the rockshaft 4, the crank screw 87 of the disconnected lift arm 80 being turned or threaded into the lower swiveled trunnion 92. Lastly, the transverse bar 130, together with its coupling members 141, is lifted into a position to engage the hooks 142 over the pins 139, and then the coupling members 141 are secured in position by inserting the lower rear pins 55 to lock the coupling members 141 to the sway brackets 135. The angular disposition of the sway links 131 with respect to one another may be varied, as desired, and thus change the effective hitch point where the brackets 135 and tool bar 130 are permitted to shift laterally relative to the tractor, by changing the positions of the coupling members 141 on the tool bar 130 to vary the lateral distance between the coupling members.

By turning the crank screws 87 in the same direction simultaneously, the rocking of the leveling frame unit 22 as a result thereof serves to raise and lower the tool-receiving bar 130, and by turning one crank screw 87 in one direction and the other crank screw 87 in the other direction, the tool bar 130 may be tilted laterally relative to the tractor. As best shown in Figure 11, one end of the bar 130 may be raised a considerable distance relative to the other so as to accommodate the attachment of a plow or similar implement to the tool bar 130 whereby the plow operates in a level position when one tractor wheel runs in an adjacent furrow. This laterally tilted position of the tool carrier is accommodated by virtue of the ball and socket type of connection at the front and rear ends of the draft links 67 and at the forward ends of the lift links 80 with the rockshaft 4. However, the arms 80 remain substantially in the planes of the side members 25, 26 of the main hitch frame unit 21 so that the amount of tilt is always under the control of the two crank screws 87. However, even in the tilted position, the tool bar 130 and associated tools or implements are free to rise and fall, relative to the tractor, limited only by the contact of the ball joint arms 95 with the associated stop pins 99.

A modified form of the present invention is shown in Figures 16 and 17. In this form of the invention an arm 201 is fixed to each end of the tractor power lift rockshaft 4, and each arm includes an arm section 202 which is provided with an upwardly facing socket 203 and, radially inwardly thereof, an arcuate row of openings 204. A bail member 207 comprising two parts having side arm sections or links 208 is swingably connected with the arms 201 by means of a pair of laterally spaced apart inner and outer brackets 209 and 211 apertured at their forward ends to receive a quick-detachable pin 212 which pivotally connects the forward end of each bail side arm 208 to the associated power lift actuated arm 201. Each pair of brackets 209, 211, rearwardly of its forward end, is apertured to receive a stop in the form of a tubular bushing 213 which is adapted to seat in the socket 203 of the associated lifting arm 201. The bushings 213 serve as pivot means for the bail 207 when making certain adjustments, as will be pointed out below. The left hand lifting arm 201 is provided with a bifurcated extension 216 which carries a trunnion member 217 in which the upper portion of a screw-threaded adjusting member 218 is disposed. The lower portion of the member 218 is threaded into a lower trunnion 219 swiveled in an adjusting arm 221 which is pivoted at 222 to the lower portion of the left hand power lift arm 201. The forward and lower portion of the arm 221 is provided with a pivot member 224 on which a roller 225 is disposed. The upper end of the screw-threaded member 218 carries a universal joint 227 to which an adjusting crank member 228 is connected. An angle bracket 229 is fixed by any suitable means at its lower end to an abutment block 231 and at its upper end is provided with an apertured lug 232 which receives the upper portion of the adjusting crank 228. The adjusting member 218 normally holds the stop arm 221 in a given position relative to the power lift actuated arm 201, thus determining the lower limit to which the bail 207 may swing when the power lift rockshaft 4 is rocked in a clockwise direction (Figure 16). The stop bushing 213 and associated parts act with the socket 203 to form a one-way connection between the lift arms 201 and the bail 207 whereby the latter, together with associated parts, may move upwardly relative to the lift arms 201, but lifting movement of the latter, as by a counterclockwise movement of the power lift rockshaft 4, acts to raise the bail 207 and associated parts.

Connected to be raised and lowered by corresponding movements of the bail 207 is the main frame structure of the integral tool carrier, indicated in its entirety by the reference numeral 235. Preferably, the frame structure 235 comprises an upper leveling frame section 236 and a lower main frame section 237. The upper frame section 236 is hingedly connected with the central portion of the bail 207 by means of a link structure 238. As best shown in Figures 16 and 21, the link structure 238 comprises a central sleeve member 239 and pairs of parts in the form of generally triangular bracket plates 240 and 241 fixed to the ends of the sleeve 239. The latter member is rockably mounted on the central portions of the bail sections 208, holding them rigidly in alignment. Collars 243 on the central portions of the bail sections 208 hold the link member 238 against lateral displacement on the bail 207. The link structure 238 is adapted to be fixedly connected to the leveling frame section 236 so as to form a part thereof.

The leveling frame structure includes a transverse, generally vertically disposed plate 242 which is generally U-shaped in formation and having front and rear plate sections 244 and 245. In the upper right-hand corner of the member 242 the front and rear wall portions thereof are apertured, as at 247, to provide means for receiving a trunnion 248 swiveled therein. The trunnion 248 receives an adjusting crank screw 249 which is connected at its lower end, as will be explained later in detail, to the right-hand portion of the main lower frame section 237 which is pivotally connected with the upper leveling frame section 236. The right-hand marginal portions of the front and rear plate sections 244 and 245 are interconnected by a bracket 251, the forwardly extending portion of which is apertured to receive a pivot 252 by which the bracket 251 is connected to the right-hand link brackets 240. The left edge portions of the plate sections 244 and 245 are interconnected by a bracket member 253 which also has a forwardly extending portion apertured to receive a pivot pin 254 by which the left portion of the U-shaped plate member 242 is pivotally connected with the left-hand link brackets 241. The upper portion of the left-hand bracket 253 is apertured, as at 255, and in alignment with the latter aperture is a bearing ring member 256 spaced laterally inwardly with respect to the aperture 255, the latter and the ring member 256 being on opposite sides of an upwardly opening aperture 257 through which a left-hand adjusting crank screw 258 extends. The adjusting crank screw 258 includes an upper threaded section 259, which is disposed in a trunnion 261 swiveled in the aperture 255 and the aperture in the ring member 256, and a lower threaded portion 261 which is received in a lower trunnion 263 which is swiveled in apertures 264 formed in the left-hand pair of link brackets 241. Turning the adjusting screw 258 therefore swings the link member 238 upwardly and downwardly about its axis of hinged connection 252, 254 with the leveling frame 236, the link member 238 being connected hingedly with the central portion of the bail member 207, at the rear thereof as best shown in Figure 16.

The lower main frame section 237 comprises a generally vertically arranged arch structure including an upper central crossbar section 271 which includes front and rear channel-like members 272 and 273 welded together along their upper and lower edges. The side portions of the lower main frame structure 235 form generally vertically disposed frame sections and comprise inner and outer end plates 274 and 275 welded at their upper portions to the channels 272 and 273 and spaced apart below the channels by blocks 276 and 277, each of which is provided with a pin-receiving aperture 278. The right-hand portions of the front and rear channels 272 and 273 have inwardly pressed portions 281 which are apertured, as at 282, the apertures being reenforced by rings 283 welded to the recessed sections 280 about the apertures 282. A trunnion 284 extends through the openings 282 and rotatably receives the lower reduced end 285 of the adjusting crank screw 249. By virtue of this arrangement, turning the crank screw 249 in one direction or the other serves to rock the lower main frame section 237 in one direction or the other about a generally fore and aft extending axis, thereby leveling the lower main frame section and associated parts. The left-hand portions of the front and rear channels 272 and 273 are constructed and apertured similar to the right-hand portions, just described, and receive a pivot 286 which extends through openings in the lower left-hand portions of the plates 244 and 245, as best shown in Figure 18. Thus, the lower main frame section 237 may be shifted about a generally fore and aft extending axis relative to the upper or leveling frame section 236. The lower ends of the side plates 274 and 275 are apertured to receive pivot members 290 by which the rear ends of generally fore and aft extending draft links 291 are connected thereto, the connections being similar to the connections shown in Figure 3 and described above. Similarly, the forward ends of the draft links 291 are universally connected with pairs of lugs 53a carried by the tractor in substantially the same way and by the same means as described above in connection with the drawbar bracket 50 and the lugs 53a carried thereby.

The lower main frame section 237 is adapted to receive and support a transverse tool bar, indicated by the reference numeral 295 in Figure 17, in substantially the same way that the tool bar 130 is received and supported in the form of the invention shown in Figure 1. To this end, hinge pins 296 are disposed in the openings 278 in the spacing blocks 276 and 277, the pins 296 receiving the forward ends of a pair of sway links 297 each of which, as best shown in Figure 22, comprises a forward sleeve section 301, a rear sleeve section 302, and a pair of rigidly interconnected, laterally outwardly bowed plates 303 and 304, all securely welded together. The forward sleeve sections 301 are swingably mounted on the pins 296, and the rear sleeves 302 receive hinge pins 306 by which the rear ends of the sway links 297 are connected to attaching and clamping structure substantially the same as the attaching and clamping structures 135 and 141 shown in Figure 1 et al. and described above.

For the purpose of limiting the lateral movement of the tool bar 295, connected to the lower main frame section 237 by the sway links 297, we fix a transverse bar 311 at its downturned ends to the laterally inner portions of the associated attaching structure 135. A sway stop 308 is fixed, as by welding, to the lower central portions of the lower main frame angle channels 272 and 273, the sway stop 308 preferably including upper and lower plate sections 313 and 314, disposed on opposite sides of the bar 311. The latter member is substantially the same as the transverse bar 161 described above and likewise carries laterally adjustable link locks 315 which cooperate with the end portions of the sway stop plates 313 and 314 to limit or prevent lateral movement of the tool bar 295 relative to its supporting structure. In order to bring the link locks 315 in operative association with the sway stop member 308, the central portion of the transverse bar 311 is disposed forwardly of the end portions thereof, which are fixed to the attaching structure clamps 135.

The operation of a tool carrier constructed as described above in connection with Figures 16 et seq. is substantially as follows.

The lifting load, when raising the tool bar 295 and tools or implements connected thereto, is equalized between the two lift arms 201 mounted on the tractor rockshaft 4. The member 207 constitutes an upper link connecting the tool carrier frame 235 with the tractor and the members 291 constitute lower links connecting the lower portions of the tool carrier frame structure 235 with the tractor for generally free upward swinging relative to the tractor. The virtual hitch point established by the aforesaid links may be varied, as desired, by removing the pins 212 and connecting the forward ends of the arms 209 and 211 of the bail 207 with the power lift arms 201 in different apertures 204. In making the aforesaid adjustment, the bail 207 moves about the bushings 213 as a center, whereby the bushings 213 serve as pivot means. When ground-working tools, such as plows or the like, are connected to the tool bar 295, the suck adjustment may be varied by turning the adjusting crank 258 in one direction or the other, which has the effect of shifting the sleeve 239 of the link member 238 generally forwardly or rearwardly, thus tilting the tool carrier about a generally transverse axis 252, 254 and raising or lowering the tool bar 295. The tool bar 295 may be leveled as described above, namely, by turning the crank screw 249 in one direction or the other, and swinging the lower main frame section 237 about its pivot connection 286 with the upper leveling frame section 236. The depth of operation may be varied by turning the crank screw 228 in one direction or the other so as to vary the position of the lower end of the stop arm 221 relative to the plate 232 which is fixed to the tractor rear axle structure which serves as an abutment against which the roller 225 bears.

The tool bar 295, like the tool bar 130 described above, is adapted to receive any one or more of a plurality of different kinds of tools and implements. For example, as shown in Figure 16, a plow, indicated in its entirety by the reference numeral 325, may be fixed in any suitable way to the tool bar 295, as by clamps 326 which may be like the clamping structure 141 described above, preferably the frame 327 of the plow 325 carrying the clamps 326. The frame 327 also carries the usual plow bottoms 328. Where desired, and particularly when the plow is a two-bottom plow, the frame 327 is provided with a pair of brackets 329 which are reenforced by a rearwardly and downwardly extending brace 331 connected at its forward end to the upwardly converging ends of the brackets 329 and at its rear end to the plow frame. A ram bar 333, comprising two adjustably connected sections 334 and 335, is connected between the upper ends of the brackets 329 and a ram bar bracket 336 which is made up of front and rear triangular plates 337 and 338 interconnected and held in spaced-apart relation by a pair of reenforcing channels 339. The lower edges of the triangular plates 337 and 338 are welded to the upper edges of the lower main frame channels 272 and 273 lying within the front and rear plate sections 244 and 245 of the leveling frame section 236. The rear plate section 245 is provided with an arcuate slot 341 extending about the axis of the pivot 286 as a center, and the upper portion of the ram bar bracket 336 carries a bushing 343 which aligns with apertures 344 formed in the plates 337 and 338. A lug 345 is swiveled in the bushing 343 and extends rearwardly through the slot 341, receiving the forward end of the ram bar 333. By virtue of the construction just described, the plow 325 is rigidly braced with respect to the lower main frame section 235 and moves with the latter when the tool bar is leveled by turning the righthand crank screw 249, which shifts the lower main frame section 235 relative to the upper leveling frame section 236.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A draft device for connecting an implement to a tractor, comprising a vertically disposed hitch frame including a central transverse member and a pair of generally vertically extending members connected rigidly to the ends of said transverse member, a transverse tool-receiving bar, a pair of laterally swingable links pivotally connecting said tool-receiving bar with the lower portions of the vertical members of said hitch frame, a pair of upper laterally spaced links for connecting the upper portions of said vertical members with the tractor, a pair of laterally spaced lower links for connecting the lower portion of said hitch frame with the tractor, and means carried by the transverse member of said generally vertically disposed hitch frame for limiting the lateral movement of said laterally swingable links and said tool-receiving bar.

2. A tool carrier adapted to connect a tool to a tractor, said carrier comprising a main frame structure including an upper leveling frame section and a lower main frame section, means pivotally connecting said frame sections together for movement one with respect to the other about a generally fore-and-aft extending axis, said lower main frame section being adapted to receive a tool, a pair of laterally spaced, generally fore and aft extending draft links, means providing a universal type of connection between the rear ends of said links and said lower main frame section and between the forward ends of said links and a tractor, lifting arms connected with the upper leveling frame section for raising and lowering the latter relative to the tractor, said arms being laterally rigid relative to the tractor, and means acting between said upper leveling frame section and said lower main frame section for shifting the latter section generally about a fore-and-aft extending axis.

3. An agricultural implement adapted to be attached to a tractor and comprising a hitch frame including upper and lower sections pivotally connected together for movement one relative to the other about a generally fore and aft extending axis, a laterally rigid bail member for swingably connecting the upper frame section to the tractor for generally vertical movement about a transverse axis, laterally and vertically swingable draft link means for connecting the lower frame section with the tractor, a ground-working tool fixed to said lower frame section, adjustable means connected between said upper and lower frame sections for changing the angular relation therebetween, a bracket carried by said lower frame section, said bracket being rigid with and swingable laterally about said fore-and-aft extending axis with said lower frame section, and a brace connected with the upper portion of said bracket and the rear portion of said tool.

4. A tool carrier adapted to connect a tool to a tractor, said carrier comprising a rigid frame adapted to receive a tool, a pair of laterally spaced generally fore and aft extending draft links, means providing a universal type of connection between the forward ends of said links and a tractor, a universal type of connection between the rear ends of said links and said rigid tool-receiving frame, a rigid bail member adapted to be pivotally connected to a tractor for generally vertical swinging relative thereto, and means for adjustably connecting said rigid frame to said bail member, said last mentioned means including sleeve means rockably mounted on said rigid bail member between the ends of the latter, means pivotally connecting said rigid frame with one portion of said sleeve means, and means acting between another portion of said sleeve means and said rigid frame for adjusting the latter with respect to said last mentioned pivot means.

5. A tool carrier adapted to connect a tool to a tractor, said carrier comprising a rigid frame adapted to receive a tool, a pair of laterally spaced generally fore and aft extending draft links, means providing a universal type of connection between the forward ends of said links and a tractor, means providing a universal type of connection between the rear ends of said links and said rigid frame, a rigid bail member adapted to be pivotally connected to a tractor for generally vertical swinging relative thereto, and means for adjustably connecting said rigid frame to said bail member, said last named means including a pair of laterally spaced apart parts rockably mounted on said bail member, means pivotally connecting said rigid frame with one of said laterally spaced apart parts for movement relative thereto about a generally fore-and-aft extending axis, and means connected between the other of said laterally spaced apart parts and the rigid frame for raising and lowering the adjacent portion of the latter relative to said bail member.

6. A draft device for connecting an implement to a tractor, comprising a vertically disposed hitch frame including a central transverse member and a pair of generally vertically extending members connected rigidly to the ends of said transverse member, a pair of laterally spaced lower links having a ball and socket type connection at their rear ends with the lower portions of said vertically extending members and a ball and socket type of connection at their forward ends with the tractor, said links being swingable vertically relative to the tractor, a bail-like member having generally forwardly extending side arm portions adapted to be connected at their forward ends with the tractor, and means swingably connecting said bail-like member with the upper portion of said hitch frame for movement relative thereto about a generally transverse axis.

7. A draft device for connecting an implement to a tractor, comprising a vertically disposed hitch frame including a central transverse member and a pair of generally vertically extending members connected rigidly to the ends of said transverse member, a pair of laterally spaced lower links having a ball and socket type connection at their rear ends with said vertically extending members and a ball and socket type of connection at their forward ends with the tractor, said links being swingable vertically relative to the tractor, a bail-like member having generally forwardly extending side arm portions adapted to be connected at their forward ends with the tractor, means swingably connecting said bail-like member with the upper portion of said hitch frame for movement relative thereto about a generally transverse axis, a transverse tool-receiving bar, and a pair of laterally swingable links pivotally connecting said tool-receiving bar with the lower portions of the vertical members of said hitch frame.

8. A draft device for connecting an implement to a tractor, comprising a vertically disposed hitch frame having upper and lower sections, means pivotally connecting said sections together for movement one relative to the other about a generally fore-and-aft extending axis, a bail-like member having generally forwardly extending side arm portions adapted to be connected at their forward ends with the tractor, means swingably connecting said bail-like member with the upper section of said hitch frame for movement relative thereto about a generally transverse axis, a pair of laterally spaced lower links for connecting the lower section of said hitch frame with the tractor, the forward ends of said lower links having a ball and socket type of connection with the tractor and the rear ends of said lower links having a ball and socket type of connection with the lower portions of said hitch frame, and generally vertically acting means connected with said upper and lower sections for swinging one relative to the other about said fore-and-aft extending axis.

9. A draft device for connecting an implement to a tractor, comprising a vertically disposed hitch frame, said hitch frame including a lower frame section and an upper frame section, a bail-like member having generally forwardly extending side arm portions adapted to be connected at their forward ends with the tractor, means swingably connecting said bail-like member with the upper frame section, a pair of laterally spaced lower links for connecting the lower frame section to the tractor, the forward ends of said lower links having a ball and socket type of connection with the tractor and the rear ends of said lower links having a ball and socket type of connection with the lower frame section, and means pivotally connecting the upper and lower frame sections for movement one relative to the other about a generally fore and aft extending axis.

10. A draft device for connecting an implement to a tractor of the type having a power operated rockshaft, comprising a bar-receiving hitch frame disposable generally vertically at the rear of the tractor, a pair of laterally spaced lower links having a ball and socket type connection at their rear ends with said hitch frame and a ball and socket type of connection at their forward ends with the tractor, said links being swingable vertically relative to the tractor, a bail member having side arm portions connectible at their forward ends with the tractor rockshaft, a sleeve rockably mounted on the central portion of said bail member, arm sections fixed rigidly to said sleeve, means pivotally connecting said arm sections to the upper portion of said hitch frame for movement relative thereto about a generally transverse axis, and means acting between said hitch frame and one of said arm sections for adjusting the position of said bail-receiving sleeve relative to said hitch frame.

11. A draft device for connecting an implement to a tractor of the type having a power operated rockshaft, comprising a pair of lift arms, one attachable to each end of the tractor rockshaft and each lift arm having a plurality of openings, a bail member having a pair of side arm portions, each including a forwardly extending section apertured adjacent its forward end, a pivot pin insertable in selected apertures of each forwardly extending section and into an opening in the associated lift arm for pivotally connecting said bail member to said lift arms in any one of a plurality of positions relative thereto, an abutment carried by each side arm portion, and an extension on each lift arm adapted to engage the abutment on the associated side arm portion whereby rocking movement of said rockshaft acts through said lift arms for raising said bail member in any selected position of said bail member relative to said lift arms, the openings in each lift arm being arranged arcuately about the associated abutment-engaging extension.

12. A draft device for connecting an implement to a tractor, comprising a vertically disposed hitch frame including a pair of laterally spaced apart, generally vertically disposed frame sections and a crossbar portion rigidly interconnecting said sections, a pair of laterally spaced apart tool-bar-receiving brackets, a pair of laterally swingable links pivotally connected at their rear ends with said brackets, means pivotally connecting the forward ends of said links with the lower portions of the vertically disposed frame sections of said hitch frame, a pair of upper laterally spaced links for connecting the upper portion of said frame with the tractor, and a pair of laterally spaced lower links for connecting the lower portions of said frame sections immediately forward of said laterally swingable links with the tractor.

13. A draft device for connecting an implement to a tractor, comprising a vertically disposed hitch frame including a pair of laterally spaced apart, generally vertically disposed frame sections and a crossbar portion rigidly interconnecting said sections, a pair of laterally spaced apart tool-bar-receiving brackets, a pair of laterally swingable links pivotally connected at their rear ends with said brackets, means pivotally connecting the forward ends of said links with the lower portions of the vertically disposed frame sections of said hitch frame, a generally vertically swingable structure connecting the upper portion of said frame with the tractor, and a pair of laterally spaced lower links for connecting the lower portions of said frame sections immediately forward of said laterally swingable links with the tractor.

14. A draft device as defined in claim 13, further characterized by said generally vertically swingable structure including a pair of upper arms hingedly connected at their rear ends with the upper portion of said hitch frame for movement relative thereto about a transverse axis, and means providing a ball and socket type of connection between the forward ends of said upper arms and said tractor.

15. The invention as set forth in claim 14, further characterized by means for changing the angular relation between one of said upper arms and said hitch frame to provide for tilting said transverse tool bar relative to the tractor.

16. A draft device for connecting an implement to a tractor, comprising a vertically disposed hitch frame including a pair of laterally spaced apart, generally vertically disposed frame sections and a crossbar portion rigidly interconnecting said sections, a transverse tool-receiving bar, a pair of laterally swingable links pivotally connecting said tool bar with the lower portions of the vertically disposed frame sections of said hitch frame, a pair of upper laterally spaced links for connecting the upper portion of said frame with the tractor, and a pair of laterally spaced lower links for connecting the lower portions of said frame sections immediately forward of said laterally swingable links with the tractor.

17. The invention set forth in claim 16, further characterized by said laterally spaced lower links having a ball and socket type connection at their rear ends with said hitch frame and a ball and socket type of connection at their forward ends with the tractor, said links being swingable vertically relative to the tractor, said upper links being hingedly connected at their rear ends with the upper portion of said hitch frame for movement relative thereto about a transverse axis, and means providing a ball and socket type of connection between the forward ends of said upper links and said tractor.

18. The invention set forth in claim 17, further characterized by means for changing the angular relation between one of said upper links and said hitch frame to provide for tilting said transverse tool bar relative to the tractor.

19. The invention set forth in claim 16, further characterized by individually adjustable leveling arms hingedly connected with the upper portions of said hitch frame and the rear portions of said upper links.

20. The invention set forth in claim 16, further characterized by means connected with said upper links for swinging the latter upwardly to raise said hitch frame and said tool bar, and an adjustable member carried by one of said upper links and engageable with a portion of the tractor for adjustably limiting the downward movement of said upper links and said hitch frame.

21. A draft device for connecting an implement to a tractor of the type having a power operated rockshaft, comprising a pair of lift arms, one attachable to each end of the tractor rockshaft and each lift arm having a plurality of openings, a bail member having a pair of side arm portions, pivot means connecting each bail side arm portion with the associated lift arm, said openings being generally arcuately arranged about the associated pivot means as a center, and means insertable in an opening in each lift arm for connecting the bail member thereto in different selected positions about the axis of said pivot means.

22. A draft device for connecting an implement to a tractor having a transverse rockshaft, comprising a pair of arm sections, means fixing each section to an end of said rockshaft, a generally vertically disposed hitch frame structure having rearwardly extending tool-receiving parts, said hitch frame structure including an upper leveling frame section and a lower hitch frame section, said tool-receiving parts being connected for lateral swinging with but held against generally vertical movement relative to the lower hitch frame section, means pivotally connecting the upper leveling frame section with the upper portions of said lower hitch frame section for movement relative thereto about a generally fore-and-aft extending axis, a pair of arms pivotally connected at their rear ends with said lower hitch frame section and adapted to be connected at their forward ends with the tractor, means connecting the upper leveling frame section with said arm sections for movement relative thereto about a generally transverse axis, whereby the rear portions of said rearwardly extending parts may be raised and lowered, and means acting through the upper and lower frame sections for changing the position of the lower hitch frame section relative to the tractor about said fore-and-aft extending axis.

(References on following page)

References Cited in the file of this patent

UNITED STATES PATENTS

| | | |
|---|---|---|
| 1,687,719 | Ferguson | Oct. 16, 1928 |
| 1,960,269 | Lindgren | May 29, 1934 |
| 2,140,144 | Silver | Dec. 13, 1938 |
| 2,140,712 | Mitchell | Dec. 20, 1938 |
| 2,159,669 | Morkoski | May 23, 1939 |
| 2,174,808 | Tuft | Oct. 3, 1939 |
| 2,217,900 | Graham | Oct. 15, 1940 |
| 2,317,578 | Arps | Apr. 27, 1943 |
| 2,336,410 | McKay | Dec. 7, 1943 |
| 2,342,306 | Silver | Feb. 22, 1944 |
| 2,518,215 | Wright | Aug. 8, 1950 |

FOREIGN PATENTS

| | | |
|---|---|---|
| 62,317 | Denmark | June 6, 1944 |